United States Patent [19]
Patzer et al.

[11] Patent Number: 5,480,360
[45] Date of Patent: Jan. 2, 1996

[54] DIFFERENTIAL FOR THE AXLE DRIVE OF A MOTOR VEHICLE

[75] Inventors: Jürgen Patzer, Lenningen; Peter Meffert, Tiefenbronn, both of Germany

[73] Assignee: Porsche, Weissach, Germany

[21] Appl. No.: 232,608

[22] Filed: Apr. 25, 1994

[30] Foreign Application Priority Data

Apr. 23, 1993 [DE] Germany .................. 43 13 322.3

[51] Int. Cl.⁶ .................. F16H 57/08; F16H 1/40
[52] U.S. Cl. .................. 475/230
[58] Field of Search .................. 475/220, 230; 74/606 R

[56] References Cited

U.S. PATENT DOCUMENTS

| | | | |
|---|---|---|---|
| 3,427,900 | 2/1969 | Walker | 475/230 |
| 4,084,450 | 4/1978 | Conroy | 475/160 |
| 5,098,355 | 3/1992 | Long | 475/220 |

FOREIGN PATENT DOCUMENTS

| | | |
|---|---|---|
| 0164544 | 12/1985 | European Pat. Off. . |
| 1081956 | 12/1954 | France . |
| 2454565 | 11/1980 | France . |
| 4042173A1 | 7/1992 | Germany . |
| 445314 | 4/1936 | United Kingdom . |
| 1252520 | 11/1971 | United Kingdom . |

*Primary Examiner*—Dirk Wright
*Attorney, Agent, or Firm*—Evenson McKeown Edwards & Lenahan

[57] ABSTRACT

A differential for the axle drive of a motor vehicle has a differential case which is made of thin-walled metal sheets and which is freed of forces caused by the bevelled gearing of the differential bevel gears and axle shaft gears. The axle shaft gears are disposed in a separate cage which absorbs the forces acting in the direction of the axle drive shafts, and the forces acting in the direction of the axle bolt are supported, for example, directly in the ring gear. As a result, the differential can be manufactured with a high stiffness while its weight and costs are reduced.

20 Claims, 5 Drawing Sheets

DIFFERENTIAL FOR THE AXLE DRIVE OF A MOTOR VEHICLE

BACKGROUND AND SUMMARY OF THE INVENTION

The present invention relates to a differential for the axle drive of a motor vehicle, having a differential case which carries a drive gear and in which an axle bolt is disposed which carries differential bevel gears, these differential bevel gears meshing with axle shaft gears which are arranged on axle drive shafts, and these gears being constructed as bevel gears.

U.S. Pat. No. 4,084,450, shows a differential of the above type which has a cast differential case to which a flange is cast for the detachable fastening of a driving gear constructed as a ring gear. In two opposite bores of this case, an axle bolt is fitted which carries the differential bevel gears. The axle shaft gears which are assigned to the axle drive shafts mesh with the differential bevel gears and are supported in the differential case. The above-described state of the art represents the conventional construction of today's differentials. With such constructions, the differential case is comparatively heavy and massive because it must transmit the drive torque introduced via the ring gear and must absorb the forces resulting from the obligatory bevel gearing of the differential bevel gears and axle shaft gears. For the mounting of the gears situated on the inside, the case, as in U.S. Pat. No. 4,084,450, is constructed to be divided in a detachable manner or is provided with corresponding openings for the inserting of the gears. Such openings reduce the stiffness of the case and are generally compensated by a correspondingly massive component dimensioning.

An object of the present invention is to provide an improved differential for the axle drive of a motor vehicle which is to be optimized with respect to stiffness, is of a light weight, is low in price and is easy to mount.

This and other objects are achieved by the present invention which provides a differential for the axle drive of a motor vehicle, comprising a differential case which carries a drive gear, an axle bolt disposed in the differential case, differential bevel gears carried by the axle bolt, axle drive shafts and axle shaft gears arranged on the axle drive shafts, the differential bevel gears meshing with the axle shaft gears which are arranged on axle drive shafts, the axle shaft gears being bevel gears, and a cage in which the axle shaft gears are disposed and which absorbs the forces acting in a direction of the axle drive shafts.

When, in the case of a differential of this type, the axle shaft gears are disposed in a cage which absorbs the forces acting in the direction of the axle drive shafts, the differential case is freed from these forces and may therefore have correspondingly smaller dimensions. This leads to a reduction of the weight and the costs of the differential case. The separate cage permits the inserting of the axle shaft gears and of the axle bolt before the whole differential is mounted. This pre-assembling possibility simplifies and shortens the assembly of the differential.

Since the differential case is freed of the forces absorbed in the cage, it may be constructed to be optimized with respect to stiffness for the transmission of the torque introduced via the driving gear which is constructed, for example, as a ring gear, and of the resulting forces. This may be implemented at reasonable cost, for example, by means of deep-drawn, thin-walled sheet metal parts.

In certain embodiments, the differential can be improved when the ring gear is arranged in the area of the longitudinal axis of the axle bolt. As a result, a direct flux of force is ensured from the ring gear to the axle bolt. A particularly simple, low-cost and stiff construction of the differential case is possible when this case comprises two rotationally symmetrical pots. These may be joined directly, for example, in an overlapping manner, in which case the ring gear is undetachably fitted on in the area of the joint, or they may be connected with one another indirectly via the ring gear to which they are joined.

The weight of the differential case can be reduced further and the flux of force can be improved when the axle bolt is disposed in a recess of the ring gear so that the introduced torque is transmitted directly from the ring gear into this bolt. The forces which act in the direction of the axle bolt and which are caused by the bevelled gearing of the gears may advantageously be supported directly in the ring gear or may be supported in a closed flux of force on the axle bolt. In both cases, the differential case is also freed of these forces and may therefore have correspondingly smaller dimensions.

When the axle bolt, being provided with pins on one or on two sides, engages in a floating manner either in recesses of the ring gear or of the differential case, the differential can automatically adjust according to the existing equilibrium of forces. It is therefore particularly insensitive to position tolerances of the bevel gears with respect to one another which, as a result, can be manufactured and positioned with respect to one another in a simple and low-cost manner. Furthermore, smaller differential bevel gears may be used because the forces for each tooth meshing are the same. Depending on the tolerance position and on the equilibrium of forces, the axle bolt may travel slightly into the direction of the axle shafts which necessarily, via the bevel gearing, leads to a slight travelling in the longitudinal direction of the axle bolt.

The additional expenditures for the cage can be limited in that this cage is formed in a simple and elegant manner from circular-disk-shaped segments which support the axle shaft gears and from struts connecting these segments. This type of a cage can be manufactured in one or two pieces as a sheet metal stamping at low cost, and in a low-weight and stiff manner. When it is manufactured in one piece, the stamping is shaped as a cage by a corresponding bending and by being joined at one point. When it is constructed in two pieces, these are bent as identical U-shaped parts and are connected with one another at two points. Furthermore, the above-described differential offers the advantage that the ring gear can be manufactured in a simplified manner because the screwing to the differential case is eliminated, and the ring gear has no distortions as a result of tapholes.

The rotationally symmetrical construction of the pots, together with the elimination of openings for the mounting of the gears, results in a smooth surface which causes low adulteration losses of the differential case revolving in an axle housing which accommodates the differential and its drive.

The closed construction of this differential case offers the possibility of an encapsulating and thus of a separate lubrication of the differential apart from the lubrication required in the axle housing.

Other objects, advantages and novel features of the present invention will become apparent from the following detailed description of the invention when considered in conjunction with the accompanying drawing.

DETAILED DESCRIPTION OF THE DRAWINGS

Figure 1:
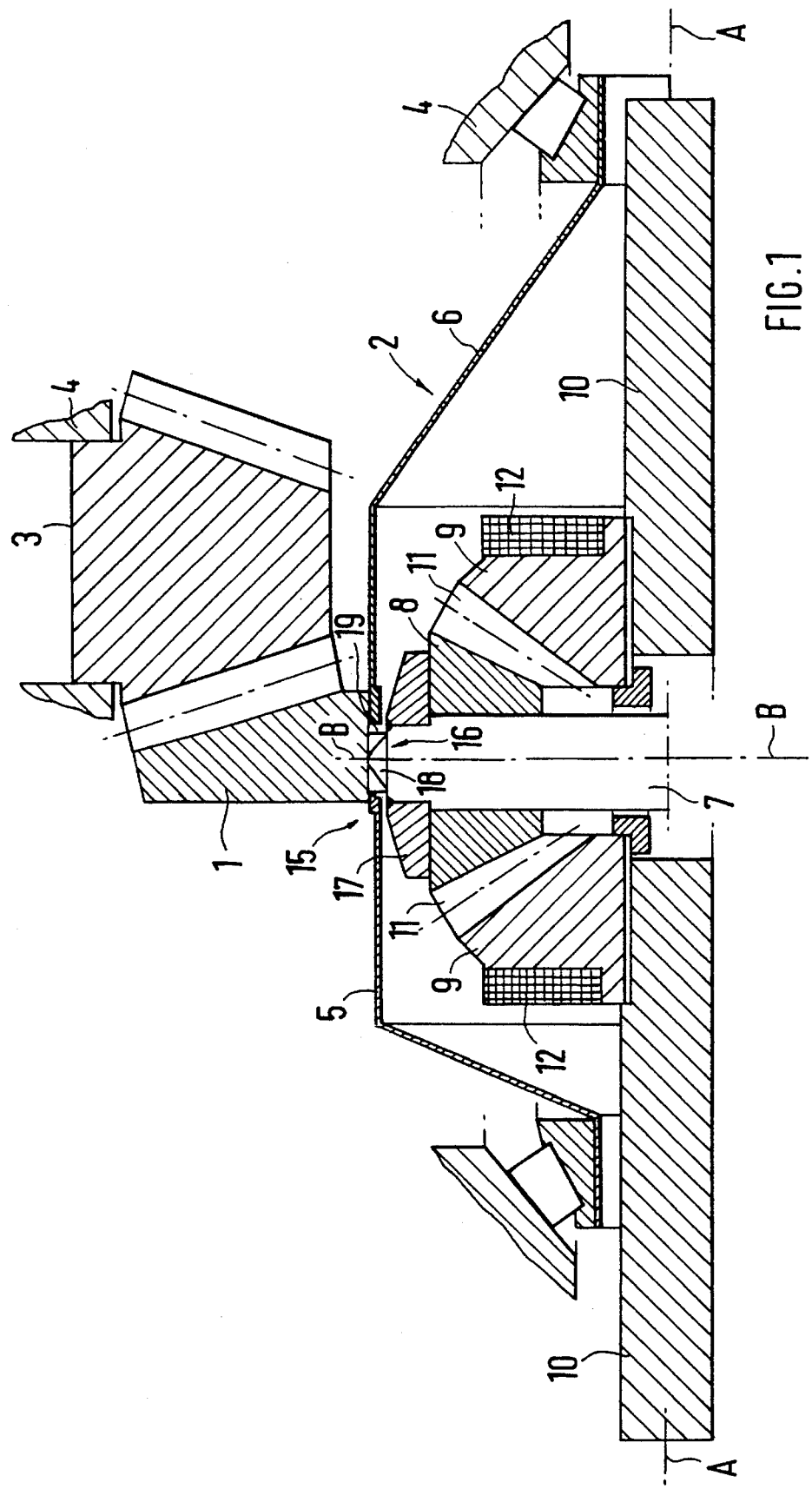
FIG. 1 is a sectional view of a differential constructed according to a first embodiment of the present invention.

A differential for the axle drive of a motor vehicle comprises a differential case 2 which carries a driving gear constructed as a ring gear 1 and which, as well as a pinion 3 driving the ring gear 1, is rotatably disposed in an axle housing 4 which is only outlined.

The differential case 2 is formed by two pots 5, 6 which are disposed in a rotationally symmetrical manner with respect to an axis of rotation A—A and which may be identical.

An axle bolt 7 supports a differential bevel gear 8 in a rotatable manner which meshes with axle shaft gears 9 which are non-rotatably disposed on axle drive shafts 10 which are connected with vehicle gears which are not shown. The differential bevel gears 8 and axle shaft gears 8 and 9 engage with one another via a bevelled gearing 11.

Figure 4:
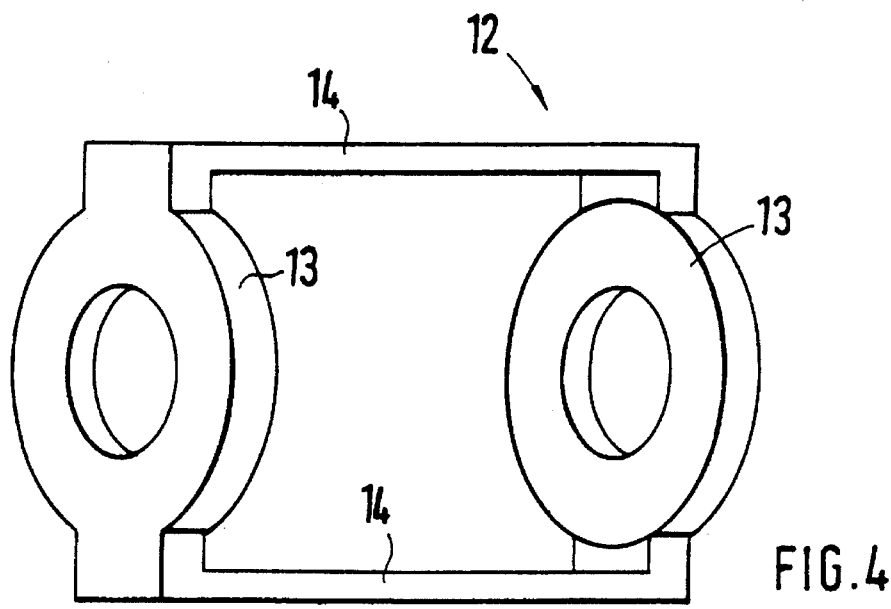
FIG. 4 is a perspective view of a cage for the bearing of the axle shaft gears.
Figure 5:
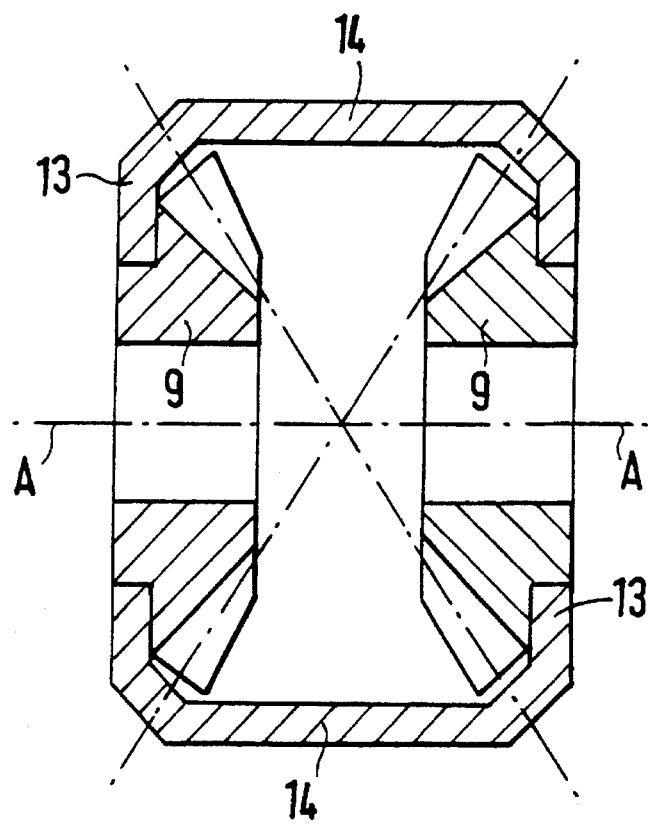
FIG. 5 is a sectional view of the cage according to FIG. 4 with inserted axle shaft gears.

The axle shaft gears 9 are disposed in a cage 12 which is formed of circular-disk-shaped segments 13 and struts connecting these segments 13 (FIG. 4). This cage 12 absorbs the forces acting via the bevelled gearing 11 in the direction of the axis A—A and is therefore stressed with respect to tension. The ring gear 1 is arranged in the area of a joint 15 of the pots 5, 6 and in an area 16 in which a longitudinal axis B—B of the axle bolt 7 is situated.

According to FIG. 1, the pots 5 and 6 are welded together in an overlapping manner with one another in the area of the joint 15. The ring gear 1 is, for example, also by means of welding, fitted onto this joint 15. In the direction of the longitudinal axis B—B, the differential bevel gear 8 is supported on a stop 17 welded onto the axle bolt 7. On the end side, this bolt 7 has a pin 18 by means of which it is floatingly inserted into a recess 19 in the area of the joint 15. This recess 19 penetrates the joint 15 and, in addition, may also be formed in the ring gear 1 or the pots 5 and 6.

Figure 2:
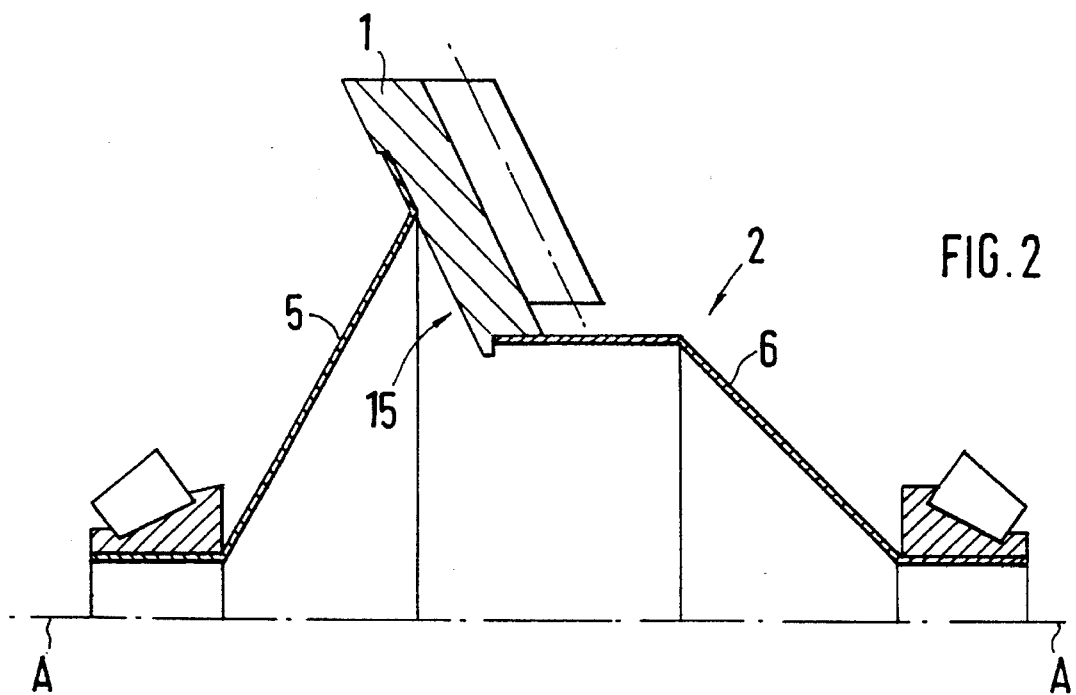
FIG. 2 is a sectional view of a differential constructed according to a second embodiment of the present invention.
Figure 3:
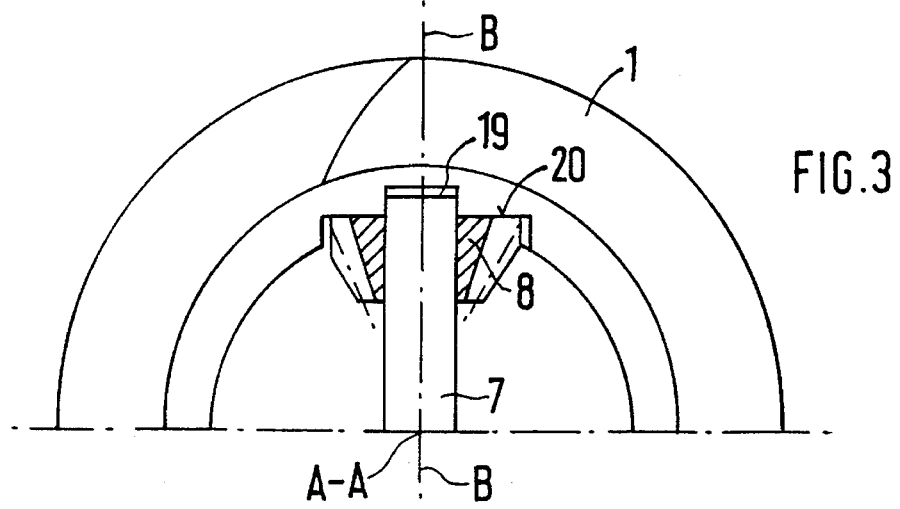
FIG. 3 is a view of an axle bolt disposed in the ring gear.

In certain embodiments, the pots 5 and 6 according to FIG. 2 may be joined to the ring gear 1, and the recess 19 may be arranged exclusively in the ring gear 1 according to FIG. 3. According to this FIG. 3, the differential bevel gears 8 may be supported in the direction of the longitudinal axis B—B in a shoulder 20 of the ring gear 1.

In each case, the recess 19 is designed such that the axle bolt 7 can be displaced slightly in the direction of the axis of rotation A—A and in the direction of the longitudinal axis B—B.

Figures 6A, 6B, 6C:
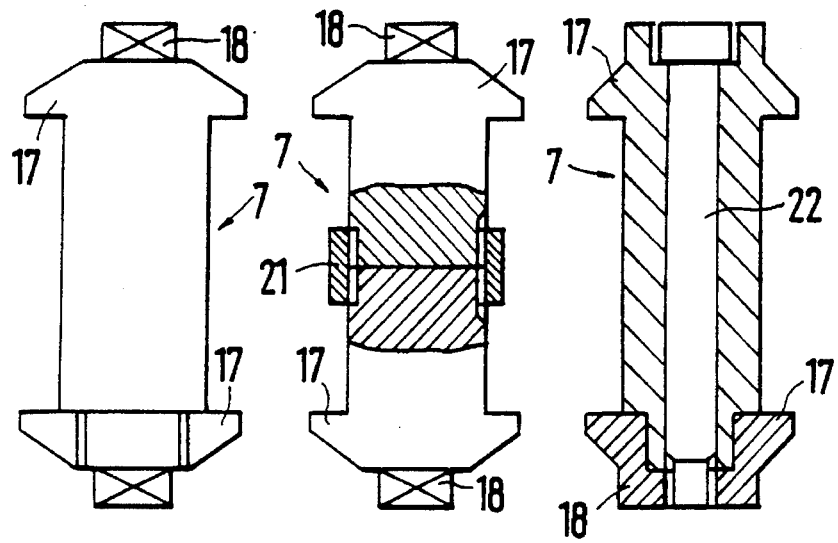
FIGS. 6a to g are views of various embodiments of an axle bolt.

For the embodiment according to FIG. 1, the axle bolt 7 may, for example, be constructed according to FIGS. 6a to 6g. FIGS. 6a to 6c each show axle bolts 7 provided with screwed connections, in which case, according to FIG. 6a, the stop 17 is screwed on at one or both ends. According to FIG. 6b, the axle bolt 7 has a divided construction, the parts being held to one another by a union nut 21. The stops 17 may be constructed in one piece with the parts of the axle bolt 7. FIG. 6c illustrates a hollow axle bolt 7 through which a screw 22 extends which acts as a tie rod.

Figures 6D, 6E, 6F, 6G:
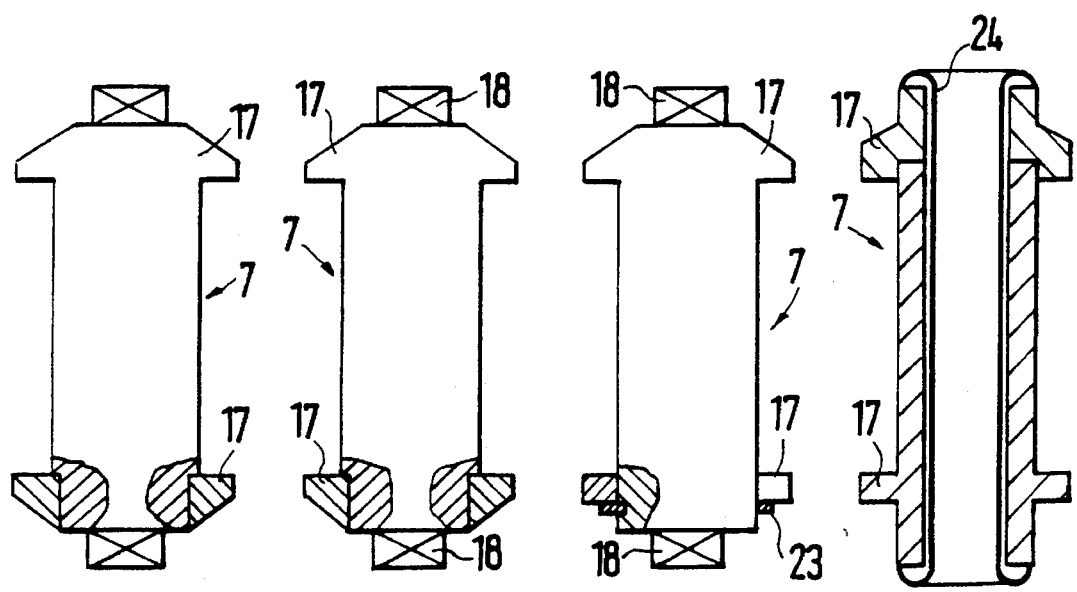

FIGS. 6d to 6g each show variants without any screwed connection, in which case according to FIG. 6d, the stop or stops 17 are welded on and according to FIG. 6e, they are shrunk on.

FIG. 6f shows a stop 17 which is fixed by means of a retaining ring 23, and FIG. 6g shows a hollow axle bolt 7, in the interior of which a sleeve 24 is arranged. This sleeve 24 is flanged on both ends.

Figure 7A:
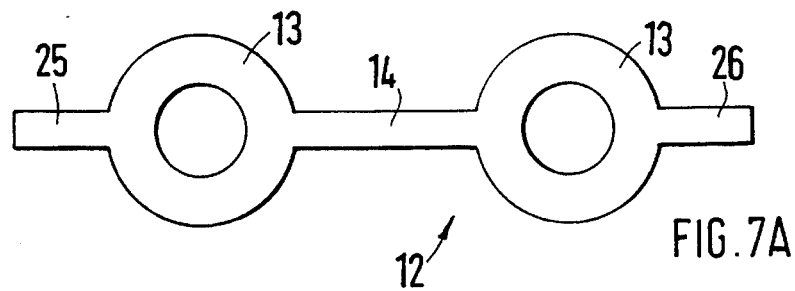
FIG. 7a is the developed view of a cage according to FIG. 4.
Figure 7B:
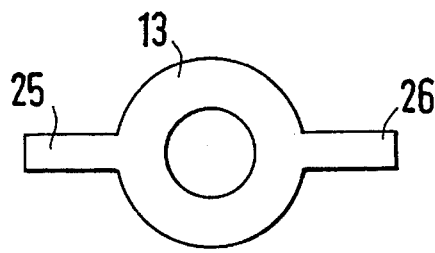
FIG. 7b is the developed view of a part of a cage according to FIG. 4.
Figures 8A, 8B, 8C:
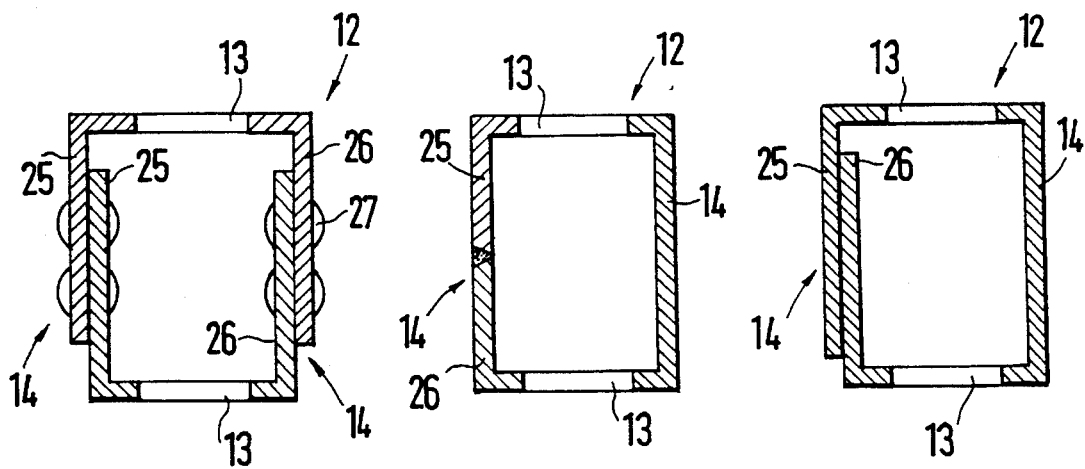
FIGS. 8a to c are top views of joined cages according to FIGS. 7a and b.

FIGS. 7a and b are developed views of a cage 12, in which case, according to FIG. 7a, this cage is manufactured in one piece as a sheet metal stamping and is brought by means of bending into a shape according to FIGS. 8b or 8c. In this case, one of the struts 14 comprises two partial struts 25 and 26 which, for example, according to FIG. 8a, may be connected with one another by welding or according to FIG. 8c, may be connected with one another in an overlapping manner by means of gluing or soldering. A cage 12 according to FIG. 8a comprises two identical stampings according to FIG. 7b and is joined together according to the above-described process or by means of rivets 27.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A differential for the axle drive of a motor vehicle, comprising:
   a differential case which carries a drive gear;
   an axle bolt disposed in a recess in the differential case;
   differential bevel gears carried by the axle bolt;
   axle drive shafts and axle shaft gears arranged on the axle drive shafts, the differential bevel gears meshing with the axle shaft gears which are arranged on axle drive shafts, the axle shaft gears being bevel gears; and
   a cage in which the axle shaft gears are disposed and which absorbs the forces acting in a direction of the axle drive shafts.

2. A differential according to claim 1, wherein the drive gear is a ring gear arranged in an area of the longitudinal axis of the axle bolt.

3. A differential according to claim 2, wherein the differential case comprises pots which are each rotationally symmetrical and joined together at a joint, the ring gear being undetachably fitted on in the area of the joint.

4. A differential according to claim 2, wherein the differential case is joined together by two pots which are each rotationally symmetrical and are joined to the ring gear.

5. A differential according to claim 2, wherein the ring gear has a recess and the axle bolt is disposed in the ring gear recess.

6. A differential according to claim 1, wherein the differential bevel gears are supported on the axle bolt in the direction of the longitudinal axis of the axle bolt.

7. A differential according to claim 1, wherein the differential bevel gears are supported in the direction of the longitudinal axis of the axle bolt in the ring gear.

8. A differential according to claim 6, wherein the axle bolt has at least on one side a pin, said pin engaging in a floating manner in the recess in the differential case.

9. A differential according to claim 1, wherein the cage is formed of circular-disk-shaped segments and struts connecting the segments, the segments supporting the axle shaft gears.

10. A differential according to claim 3, wherein the axle bolt has at least on one side a pin, said pin engaging in a floating manner in a recess in the area of the joint.

11. A differential according to claim 4, wherein the axle bolt has at least on one side a pin, said pin engaging in a floating manner in the recess in the differential case.

12. A differential according to claim 1, wherein the drive gear has a recess and the axle bolt is disposed in the drive gear recess.

13. A differential for the axle drive of a motor vehicle, comprising:

a differential case which carries a drive gear having a recess;

an axle bolt disposed in the drive gear recess;

differential bevel gears carried by the axle bolt;

axle drive shafts and axle shaft gears arranged on the axle drive shafts, the differential bevel gears meshing with the axle shaft gears which are arranged on axle drive shafts, the axle shaft gears being bevel gears; and a cage in which the axle shaft gears are disposed and which absorbs the forces acting in a direction of the axle drive shafts.

14. A differential according to claim 13, wherein the drive gear is a ring gear arranged in an area of the longitudinal axis of the axle bolt.

15. A differential according to claim 14, wherein the differential case comprises pots which are each rotationally symmetrical and joined together at a joint, the ring gear being undetachably fitted on in the area of the joint.

16. A differential according to claim 14, wherein the differential case is joined together by two pots which are each rotationally symmetrical and are joined to the ring gear.

17. A differential for the axle drive of a motor vehicle, comprising:

a differential case which carries a drive gear;

an axle bolt disposed in the differential case;

differential bevel gears carried by the axle bolt;

axle drive shafts and axle shaft gears arranged on the axle drive shafts, the differential bevel gears meshing with the axle shaft gears which are arranged on axle drive shafts, the axle shaft gears being bevel gears; and a cage in which the axle shaft gears are disposed and which absorbs the forces acting in a direction of the axle drive shafts, wherein the cage is formed of circular-disk-shaped segments and struts connecting the segments, the segments supporting the axle shaft gears.

18. A differential according to claim 17, wherein the drive gear is a ring gear arranged in an area of the longitudinal axis of the axle bolt.

19. A differential according to claim 18, wherein the differential case comprises pots which are each rotationally symmetrical and joined together at a joint, the ring gear being undetachably fitted on in the area of the joint.

20. A differential according to claim 18, wherein the differential case is joined together by two pots which are each rotationally symmetrical and are joined to the ring gear.

* * * * *